(12) United States Patent
Kawai

(10) Patent No.: US 6,960,858 B2
(45) Date of Patent: Nov. 1, 2005

(54) MOTOR USING PERMANENT MAGNET

(75) Inventor: Yoichi Kawai, Aichi (JP)

(73) Assignee: Okuma Corporation, Niwa-gun (JP)

( * ) Notice: Subject to any disclaimer, the term of this patent is extended or adjusted under 35 U.S.C. 154(b) by 0 days.

(21) Appl. No.: 10/843,358

(22) Filed: May 12, 2004

(65) Prior Publication Data
US 2005/0082934 A1   Apr. 21, 2005

(30) Foreign Application Priority Data
May 27, 2003   (JP) ............................ 2003-149698

(51) Int. Cl.⁷ ..................... H02K 41/00; H02K 41/03
(52) U.S. Cl. ..................................... 310/181; 310/12
(58) Field of Search .............. 310/181, 156.65–156.73, 310/166, 168, 12, 156.55

(56) References Cited

U.S. PATENT DOCUMENTS

| | | | | |
|---|---|---|---|---|
| 2,212,192 A | * | 8/1940 | Howell ................. 310/156.66 |
| 3,757,150 A | * | 9/1973 | Benezech ................... 310/181 |
| 5,218,250 A | * | 6/1993 | Nakagawa .................... 310/12 |
| 5,719,452 A | * | 2/1998 | Sugiura ................... 310/49 R |
| 5,723,921 A | * | 3/1998 | Sugiura ................... 310/49 R |
| 5,834,865 A | * | 11/1998 | Sugiura ................... 310/49 R |
| 5,936,322 A | * | 8/1999 | Yamaguchi et al. ... 310/156.19 |
| 6,025,659 A | * | 2/2000 | Nashiki ....................... 310/12 |
| 6,191,509 B1 | * | 2/2001 | Yura et al. ............... 310/49 R |
| 2002/0047320 A1 | * | 4/2002 | Hwang et al. ................ 310/12 |
| 2003/0098620 A1 | * | 5/2003 | Ohto et al. ................... 310/12 |

FOREIGN PATENT DOCUMENTS

JP    B2-2663650    6/1997
JP    B2-3344645    8/2002

* cited by examiner

Primary Examiner—Darren Schuberg
Assistant Examiner—Ondria Garner
(74) Attorney, Agent, or Firm—Oliff & Berridge, PLC

(57) ABSTRACT

A motor which uses a permanent magnet is provided in which output thrust is improved by increasing a magnetic saturation limit and preventing reduction in magnetic flux and generation of heat is reduced by inhibiting generation of an eddy current in a magnetic pole. An N magnetic pole is formed such that its width increases as the distance from a stator increases on a side of an N pole magnetic yoke and an S magnetic pole is formed such that its width increases as the distance from the stator increases on a side of an S pole magnetic yoke. With this structure, a saturation limit of magnetic flux at an entrance of yoke which is a connection section between the N magnetic pole and the N pole magnetic yoke is increased and motor thrust is improved.

3 Claims, 11 Drawing Sheets

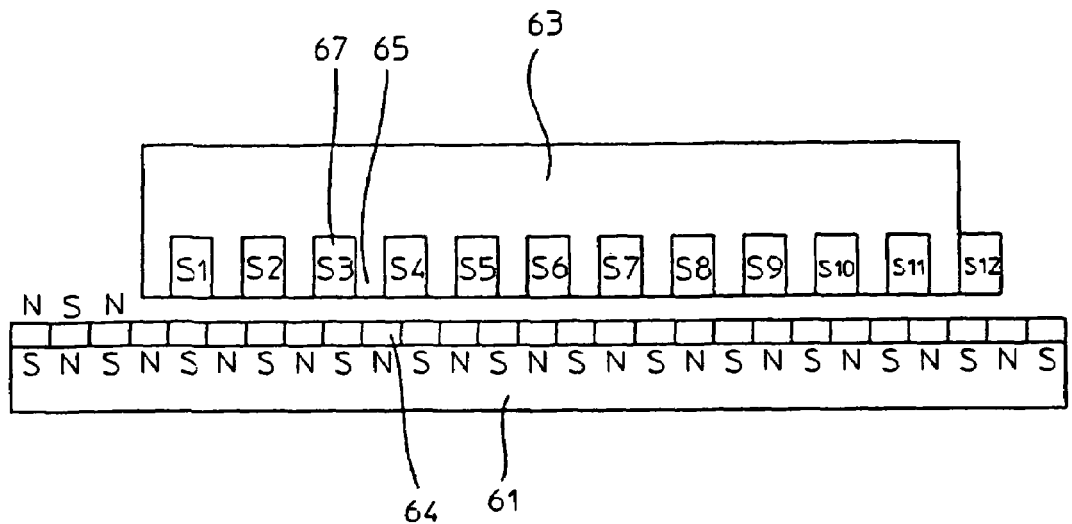
FIG. 13 [RELATED ART]
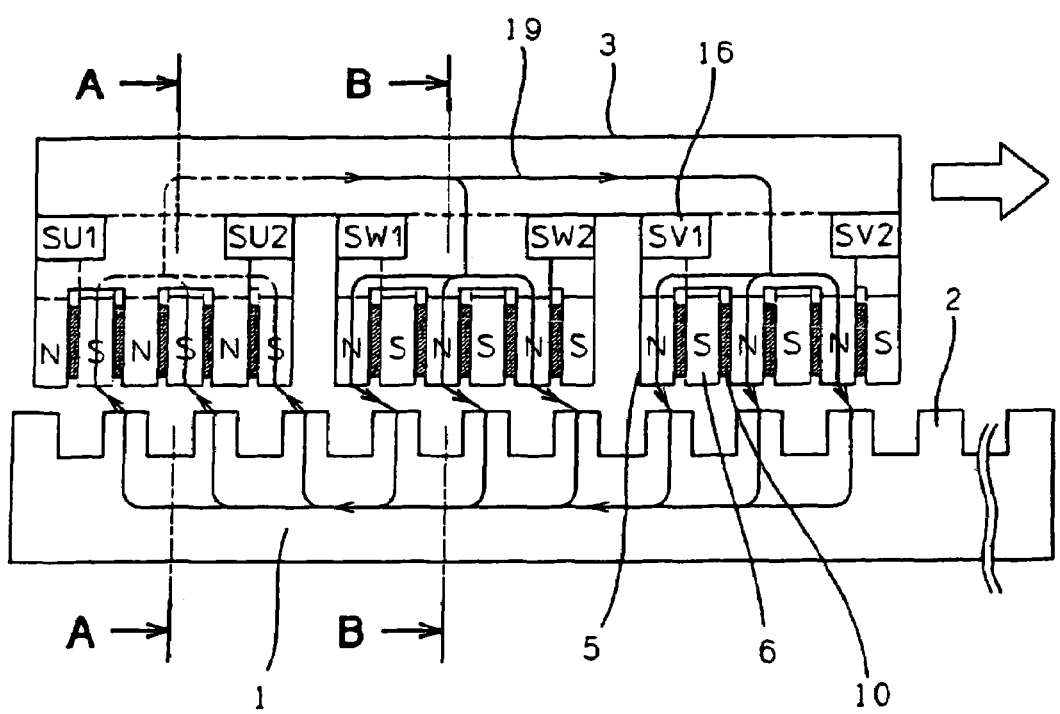
FIG. 14 [RELATED ART]

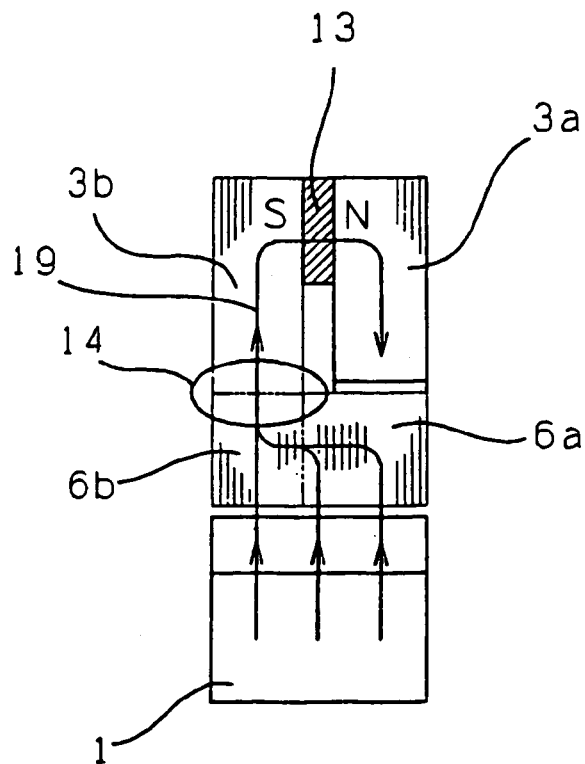
FIG. 15 [RELATED ART]
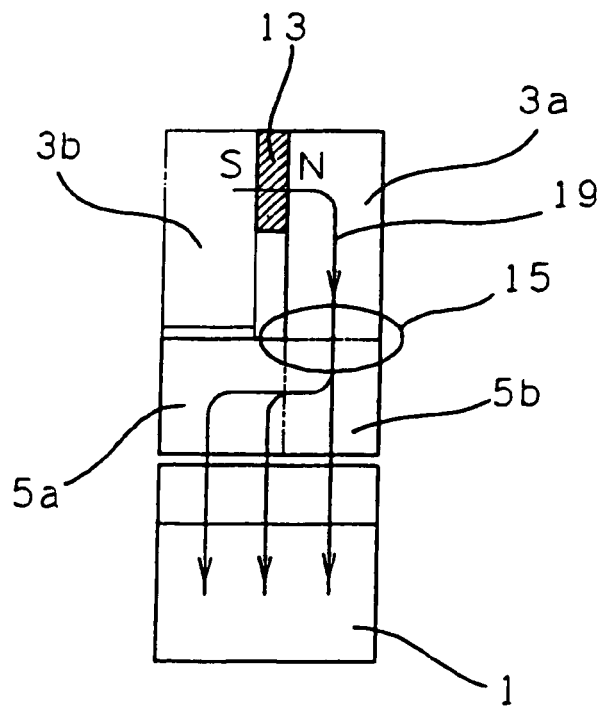
FIG. 16 [RELATED ART]

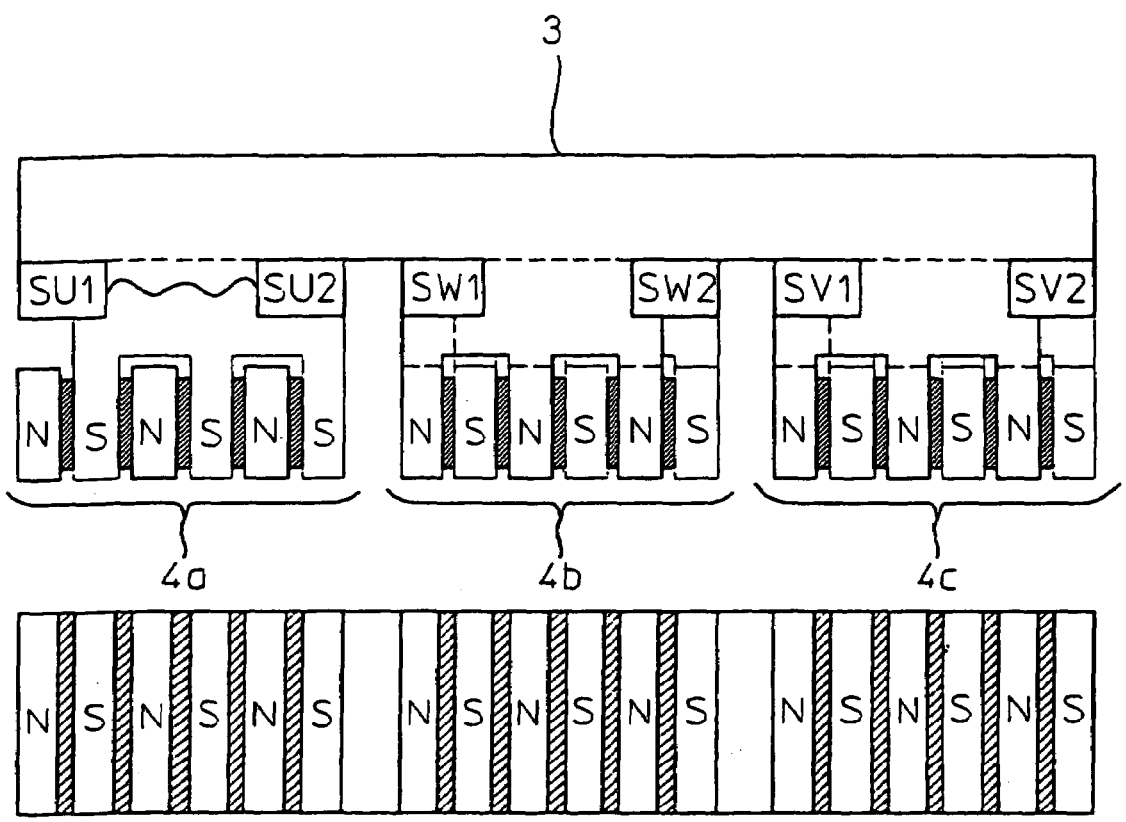
FIG. 17 [RELATED ART]

MOTOR USING PERMANENT MAGNET

BACKGROUND OF THE INVENTION

1. Field of the Invention

The present invention relates to a motor which uses a permanent magnet, and particularly to a motor structure suitable for a linear motor.

2. Description of the Related Art

FIG. 13 is a diagram showing a synchronization type linear motor according to related art. FIGS. 14, 15, 16, and 17 are diagrams showing a linear motor according to related art disclosed by the present applicant in Japanese Patent No. 3,344,645, which provides a solution to certain problems associated with a synchronization type linear motor. FIG. 15 is a diagram showing a cross section AA of FIG. 14 and FIG. 16 is a diagram showing a cross section BB of FIG. 14. FIG. 17 is a diagram showing a mover 3 seen from the side (side view) and from the bottom (bottom view).

Characteristics of a synchronization type linear motor according to the related art will now be described. In FIG. 13, reference numeral 63 represents a mover, reference numeral 67 represents slots provided in the mover 63 and illustrated by S1–S12, and two-pole three-phase AC winding which is typically used in a rotational induction motor is wound in the slot 67. Reference numeral 65 represents a mover salient pole, reference numeral 61 represents a stator, and reference numeral 64 represents permanent magnets provided on a surface of the stator in which the N poles and S poles are alternately placed.

In general, a force F generated by a winding of one turn of the motor can be represented, according to Fleming's law, as $F = B \cdot I \cdot L$, wherein B is a magnetic flux density, I is a current, and L is an effective length of electrical wire. Similarly, a power P can be represented as $P = F \cdot dX/dt$, wherein X is a position of the mover in the movement direction and $dX/dt$ is the velocity of the mover.

Electrically, the power P is represented by $P = V \cdot I = d\phi/dt \cdot I$ wherein V is voltage and $\phi$ is a magnetic flux linked to the winding of one turn. When a change of magnetic energy within the liner motor is disregarded, an equation, $P = F \cdot dX/dt = d\phi/dt \cdot I$ can be deduced from the above-described formulae, and a thrust F generated by the linear motor is $F = d\phi/dX \cdot I$. The thrust F generated by the linear motor is therefore directly proportional to a rate of change of the magnetic flux $\phi$ linked to the winding with respect to position, $d\phi/dX$.

Therefore, although not shown, when structure of a mover and a stator similar to that shown in FIG. 13 is employed with a two-pole permanent magnet type linear motor, the generated torque T, that is, the rate of change of magnetic flux p linked to the winding with respect to position, $d\phi/dX$, is nearly directly proportional to the magnetic flux density B.

Similarly, if a linear motor as shown in FIG. 13 is configured such that the winding of one turn is wound from the front side of the page toward the backside of the page at the slot S2 and from the backside of the page toward the front side of the page at the slot S8, when the mover 63 moves to the right by a slight amount, $\Delta X$, the rate of change of magnetic flux $\phi$ linked to the winding wound from slot S2 to the slot S8 with respect to position, $d\phi/dX$ is almost equal to $\Delta\phi/\Delta X$. The slight change in magnetic flux $\Delta\phi$ is thus an increase in N pole magnetic flux corresponding to the slight change in position $\Delta X$ in the mover salient pole 65 sandwiched between slots S2 and S8 and a large change of magnetic flux with respect to position, $\Delta\phi/\Delta X$, can be obtained. Therefore, in a simplified expression, the rate of change of magnetic flux with respect to position, $\Delta\phi/\Delta X$, is approximately five to six times that of the two pole permanent magnet type linear motor as described above and the output thrust is also approximately five to six times that of the two pole permanent magnet type linear motor. Such a Vernier type linear motor using a permanent magnet has a characteristic that it fundamentally has a large thrust. However, the driving frequency for controllably driving this example motor is approximately six times that of the two pole permanent magnet type linear motor, and, because of the limit of the driving frequency and inductance of the winding, in general, high speed driving is not possible.

On the other hand, in a synchronization type linear motor of the related art, there is a problem in that the magnetic flux of each permanent magnet 64 cannot be effectively utilized. For example, when the magnetic flux in the mover salient pole between the slots S2 and S3 is considered, the mover salient pole 65 opposes the N pole of the permanent magnet 64 with a small gap therebetween and there is a magnetic flux of N pole on the mover salient pole 65. However, at the same time, the magnetic flux of the S poles on both sides also leaks from non-magnetic sections, such as the space between mover salient poles 65 and, thus, there are many components in which the magnetic flux closes between the N and S poles without going though the stator. This component of the magnetic flux of the N pole which closes with the S pole without going through the stator does not contribute to driving operation. As a result, the magnetic flux of N pole in the mover salient pole 65 between the slots S2 and S3 is not sufficiently utilized. For a similar reason, in the other mover salient poles 65, effective magnetic flux cannot be sufficiently obtained, resulting in a problem in that a motor thrust is reduced, even when the motor current is suitably applied.

Another problem is that although a maximum magnetic flux density of an electromagnetic steel plate of the mover salient pole 65 has a large value of about 1.7 Tesla, a maximum magnetic density of the stator magnetic pole is about 1.0 Tesla, even when a rare earth metal which has a large remaining magnetic flux density is used. Therefore, there is a problem in that, structurally, the magnetic flux density cannot be increased. There is, however, a desire to increase motor torque by increasing a magnetic flux density of each magnetic pole in the stator 61.

Another problem is that when the linear motor has a relatively long driving range, the cost of the linear motor is significantly increased because the amount of permanent magnet mounted in the stator 61 is proportional to the length of the motor driving range. Another problem is that when the linear motor is applied to feed driving of a machine tool or the like, iron powder or the like may be present in the surrounding environment of the linear motor, and therefore, the permanent magnet 64 must be carefully covered to prevent attachment of the iron powder or the like. There is also a problem in that, because the length of the magnet portion is relatively long, the cost of the necessary cover is increased. Next, the linear motor of related art shown in FIGS. 14, 15, 16, and 17 which is disclosed by the present applicant in Japanese Patent No. 3344645 for solving the problems associated with a synchronization type linear motor as described above will be described.

In FIGS. 14 and 17, a mover 3 comprises three pairs of mover magnetic poles 4a, 4b, and 4c each having three pairs of N magnetic poles 5, S magnetic poles 6, and auxiliary magnets 10 between the N magnetic pole 5 and the S magnetic pole 6, which are provided along a direction of movement of the mover 3. AS shown in FIG. 17, the N magnetic pole 5, the S magnetic pole 6, and the auxiliary magnet 10 are placed so that N pole and S pole are alternately provided. As shown in FIGS. 15 and 16, the N magnetic pole 5 and the S magnetic pole 6 respectively comprises structures 5a and 5b and structures 6a and 6b. The structures 5a and 6a correspond, respectively, to the N auxiliary magnetic pole and the S auxiliary magnetic pole described in Japanese Patent No. 3344645.

A three-phase AC winding 16 is wound around each of the mover magnetic poles 5 and 6. U-phase windings are represented in these figures by reference numerals SU1 and SU2, V-phase windings are represented in these figures by reference numerals SV1 and SV2, and W-phase windings are represented in these figures by reference numerals SW1 and SW2. Each of the mover magnetic poles 4a, 4b, and 4c are placed in positions each of which is shifted by an electrical angle of 120 degrees with respect to the salient pole 2 of the stator 1.

Electromagnetic steel plates forming the mover 3 are an N pole magnetic yoke 3a and S pole magnetic yoke 3b in FIGS. 15 and 16 and these structures are respectively magnetically connected to the N magnetic pole 5 and the S magnetic pole 6. For the mover magnetic pole 4a in FIG. 17, a cross section of the S pole magnetic yoke 3b is shown in order to facilitate understanding of the shape of the mover 3.

A common permanent magnet 13 which is magnetically connected to the N pole magnetic yoke 3a and the S pole magnetic yoke 3b is placed in the mover 3.

When a current is applied to the three-phase AC winding 16 in a linear motor of the related art constructed as described above, the three pairs of mover magnetic poles 5 and 6 are excited to either N pole or S pole depending on the application direction of the U-phase, V-phase, and W-phase windings and a large magnetic pole of N pole or S pole is formed. A magnetic flux 19 passing through each of the mover magnetic poles 5 and 6 and the common permanent magnet 13 passes through the side of the stator 1 and a three-dimensional magnetic path is formed. At this point, a magnetic attraction force is generated corresponding to the positions of the mover 3 and the stator 1 and a thrust is output in the mover 3.

The flow of the magnetic flux will now be described in more detail. When a current is applied from the U-phase to the V-phase and W-phase, that is, when a current is applied such that the SU1, SV2, and SW2 become positive and SU2, SV1, and SW1 become negative, the mover magnetic pole 4a in FIG. 14 becomes an S pole and the mover magnetic poles 4b and 4c become N poles. As shown by the magnetic flux 19, a magnetic flux flows from the S pole magnetic yoke 3b on the backside of the mover magnetic pole 4a to the N pole magnetic yoke 3a on the front side of the mover magnetic poles 4b and 4c, and then, from the front side of the N magnetic poles 5 of the mover magnetic poles 4b and 4c to the stator. Finally, the magnetic flux returns from the S magnetic pole 6 of the mover magnetic pole 4a to the S pole magnetic yoke 3b and a three-dimensional magnetic path is formed. In this process, a force acts in a direction shown by the arrow in FIG. 14, at the boundary between the mover 3 and the stator 1, and the mover 3 moves to the right.

As described above, in the linear motor of the related art as shown in FIGS. 14–17, the N magnetic poles 5 and the S magnetic poles 6 provided in the mover magnetic poles 4a, 4b, and 4c become a common magnetic pole when a current is applied to the windings. Unlike the synchronization type linear motor of the other related art, because there is no leak magnetic flux in which a magnetic flux is closed between an N pole and an S pole without going through the stator, the motor thrust is improved.

Moreover, by supplying a magnetic flux from both the common permanent magnet 13 and the auxiliary magnet 10, it is possible to increase the magnetic flux density to approximately 1.7 Teslas which is the saturation magnetic flux of the electromagnetic steel plate, and thus, it is possible to generate a large magnetic flux on the surface of the mover 3 and, consequently, a large thrust.

Furthermore, by providing both the permanent magnet and the windings 16 on the side of the mover 3, it is possible to achieve a simple structure for the stator 1 in which an electromagnetic steel plates are layered instead of the structure of a synchronization type linear motor of the related art in which an expensive permanent magnet is used on the side of the stator 1 having a long stroke. With this structure, it is possible to reduce the cost of the motor, and, because there is no permanent magnet in the stator 1, debris such as chips does not attach, and environmental resistance can be improved.

In the linear motor of the related art described above, however, there are disadvantages, such as those that are next described.

A cross sectional area of entrances 14 and 15 of yokes shown in FIGS. 15 and 16 are reduced to approximately half of the cross sectional area of the boundary between the mover 3 of the N and S magnetic poles 5 and 6 and the stator 1. Because of this, there is a problem in that the magnetic flux is saturated in this area and the motor thrust is reduced.

In addition, as the material of the mover 3 used in the linear motor of the related art, a structure has been employed in which electromagnetic steel plates are layered in directions indicated in the N pole magnetic yoke 3a and the S pole magnetic yoke 3b in FIG. 15, in order to reduce generation of iron loss in a high speed range. As described above, when a current is applied to such a winding 16 of the mover 3 formed using electromagnetic steel plates, the magnetic flux crosses the electromagnetic plates across the direction of layering as shown in FIGS. 14–16 and is generated as a three-dimensional magnetic path within the mover 3 and the stator 1. At this point, when a current applied to the three-phase winding 16 is changed in order to drive the liner motor, the magnetic flux generated across the direction of layering of the electromagnetic steel plates, in particular, near the N and S magnetic poles 5 and 6 of the mover 3, significantly changes. As a result, there remains with this art a problem in that an eddy current flows in the electromagnetic steel plates forming the magnetic poles 5 and 6, iron loss is generated corresponding to the electrical resistance of the electromagnetic steel plates, and an undesirable amount of heat is generated in the motor.

In addition, because the eddy current described above acts against the magnetic flux passing through the magnetic poles 5 and 6, there had been a problem in that the magnetic flux flowing through each of the magnetic poles 5 and 6 is reduced and the motor thrust is reduced. Similarly, because a magnetic flux is generated across the direction in which the electromagnetic steel plates are layered, a non-magnetic insulating coating applied on a surface of each electromagnetic steel plate forming the magnetic poles 5 and 6 and magnetic yokes 3a and 3b of the mover 3 and an air layer between electromagnetic steel plates would act as a magnetic insulating portion, resulting in a problem in that, because the magnetic flux flowing through each of the magnetic poles 5 and 6 is reduced, the output thrust is reduced.

The present invention was conceived to solve the problems described above, and advantageously provides a linear motor in which a motor thrust is improved with a structure which would prevent saturation of magnetic flux around yoke entrances 14 and 15 and heat generation in the motor is reduced and the motor thrust is improved with a structure in which a magnetic flux is generated in a direction perpendicular to the direction of layering of the electromagnetic steel plates at the magnetic poles 5 and 6 of the mover 3.

SUMMARY OF THE INVENTION

In order to solve the above-described problems, according to one aspect of the present invention, there is provided a linear motor which uses a permanent magnet, the linear motor comprising a mover comprising a common permanent magnet placed along a direction of movement of the motor, an N pole magnetic yoke and an S pole magnetic yoke provided on both sides of and sandwiching the common permanent magnet, a plurality of N magnetic poles and S magnetic poles magnetically coupled to the magnetic yokes and placed to be perpendicular to the direction of movement of the motor and such that an N pole and an S pole are alternately placed, an auxiliary magnet provided between the N magnetic pole and an adjacent S magnetic pole, and an AC winding wound on the plurality of N magnetic poles and S magnetic poles; and a stator which is placed with a predetermined air gap from the mover and having a plurality of projection and depression sections on a surface opposing the mover, wherein the N magnetic pole of the mover is formed such that its width increases as a distance from the stator increases on a side of the N pole magnetic yoke, and the S magnetic pole of the mover is formed such that its width increases as a distance from the stator increases on a side of the S pole magnetic yoke.

According to another aspect of the present invention, there is provided a linear motor which uses a permanent magnet, the linear motor comprising a mover comprising a common permanent magnet placed along a direction of movement of the motor, an N pole magnetic yoke and an S pole magnetic yoke provided on both sides of and sandwiching the common permanent magnet, a plurality of N magnetic poles and S magnetic poles magnetically coupled to the magnetic yokes and placed to be perpendicular to the direction of movement of the motor and such that an N pole and an S pole are alternately placed, an auxiliary magnet provided between the N magnetic pole and an adjacent S magnetic pole, and an AC winding wound on the plurality of N magnetic poles and S magnetic poles; and a stator which is placed with a predetermined air gap from the mover and having a plurality of projection and depression sections on a surface opposing the mover, wherein a teeth core which is formed of a plurality of layered electromagnetic steel plates is inserted in the N magnetic pole and S magnetic pole of the mover in a direction perpendicular to the direction of movement of the motor.

With this structure, the magnetic flux can flow smoothly along the teeth core to the magnetic yokes 3a and 3b and does not cross the electromagnetic steel plates. As a result, reduction in the magnetic flux is prevented and the output thrust can be improved, and generation of iron loss due to an eddy current can be inhibited, and, consequently, heat generated in the motor is reduced.

According to another aspect of the present invention, it is preferable that, in the linear motor, the teeth core is formed of a block of a magnetic material instead of the layered electromagnetic steel plates.

BRIEF DESCRIPTION OF THE DRAWING

FIG. 13 is a diagram showing a synchronization type linear motor according to a related art.

FIG. 14 is a diagram showing a linear motor according to a related art.

FIG. 15 is a diagram showing an A—A cross section of the linear motor of FIG. 14.

FIG. 16 is a diagram showing a B—B cross section of the linear motor of FIG. 14.

FIG. 17 shows a side view and a bottom view of the mover of the linear motor of FIG. 14.

DESCRIPTION OF PREFERRED EMBODIMENTS

Figure 1:
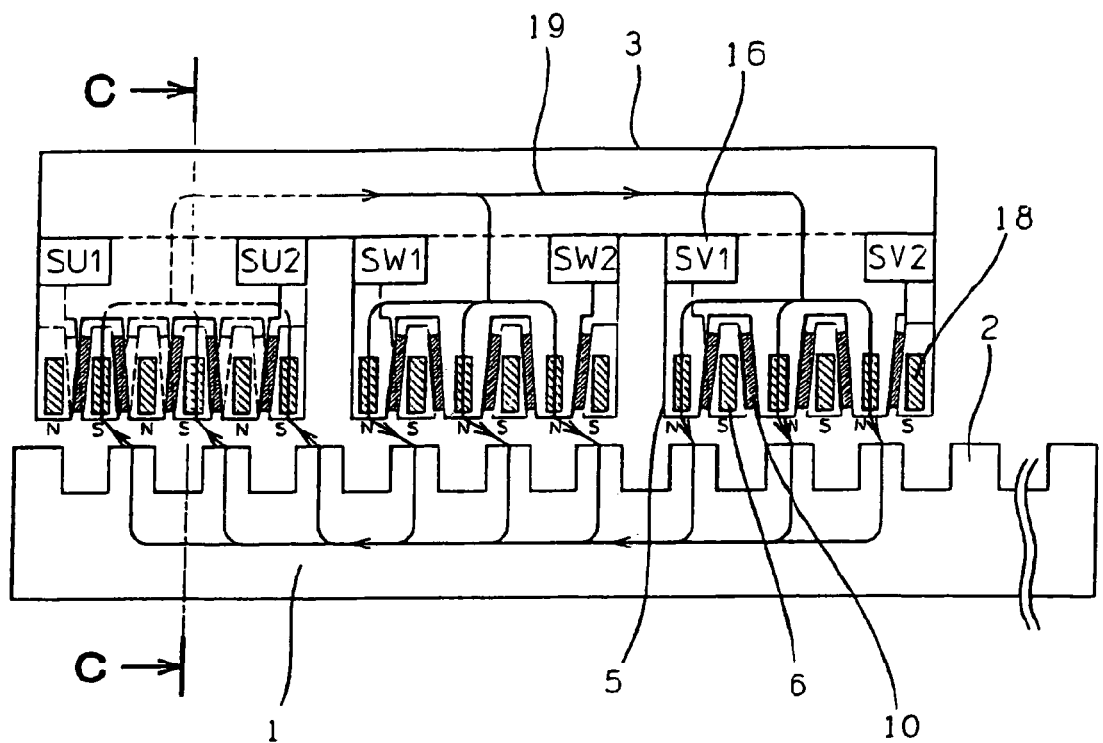
FIG. 1 is a diagram showing a linear motor according a first preferred embodiment of the present invention.

Preferred embodiments of the present invention will now be described referring to the drawings.

First Preferred Embodiment

Figure 2:
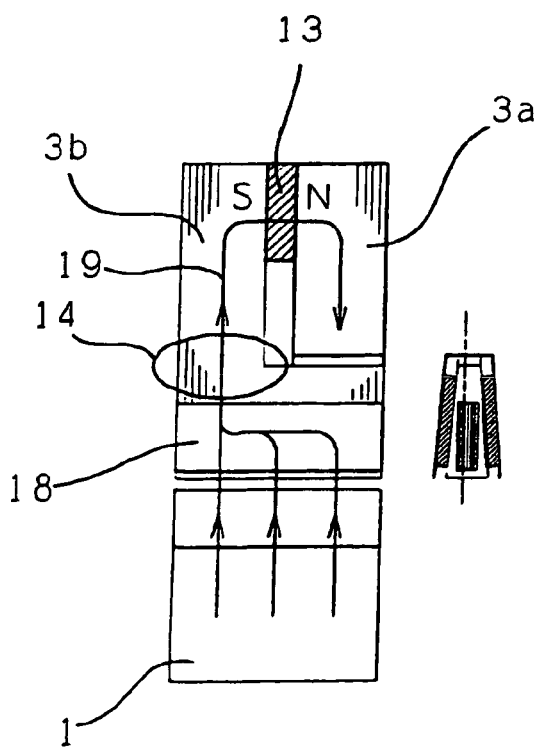
FIG. 2 is a diagram showing a C—C cross section of the linear motor of FIG. 1.
Figure 3:
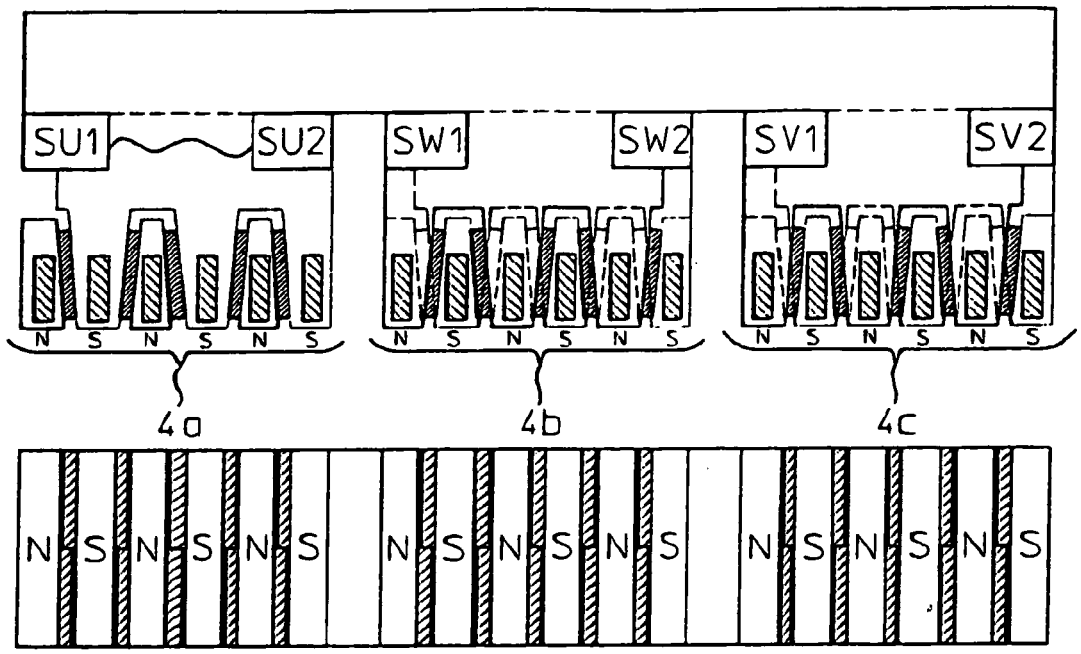
FIG. 3 shows a side view and a bottom view of the mover of the linear motor of FIG. 1.

FIGS. 1, 2, and 3 show a permanent magnet linear motor according to a first preferred embodiment of the present invention. FIG. 2 is a diagram showing a C—C cross section of FIG. 1, and FIG. 3 is a side view and a bottom view of a mover 3 of FIG. 1. The first preferred embodiment will now be described referring to FIGS. 1, 2, and 3.

In FIGS. 1, 2, and 3, reference numeral 3 represents a mover, reference numeral 3a represents an N pole magnetic yoke, and reference numeral 3b represents an S pole magnetic yoke. The N pole magnetic yoke 3a and the S pole magnetic yoke 3b are formed by layering electromagnetic steel plates. Reference numeral 16 represents a three-phase AC winding, symbols SU1 and SU2 represent U-phase windings, symbols SV1 and SV2 represents V-phase windings, and symbols SW1 and SW2 represent W-phase windings. Reference numeral 5 represents an N magnetic pole, reference numeral 6 represents an S magnetic pole, and reference numeral 10 represents an auxiliary magnetic pole. The N pole magnetic yoke 3a and the S pole magnetic yoke 3b are formed with approximately equal widths at the boundary with a stator 1. However, the N magnetic pole 5 is formed such that its width increases as the distance from the stator 1 increases on the side of the N pole magnetic yoke 3a and its width decreases as the distance from the stator 1 increases on the side of the S pole magnetic yoke 3b. Meanwhile, the S magnetic pole 6 is formed such that its width decreases as the distance from the stator 1 increases on the side of the N pole magnetic yoke 3a and its width increases as the distance from the stator 1 increases on the side of the S pole magnetic yoke 3b. FIG. 3 shows that the N magnetic poles 5 and the S magnetic poles 6 are placed in alternating order of N pole, S pole, and so on. As shown in FIG. 2, a common permanent magnet 13 which is magnetically connected to the N pole magnetic yoke 3a and the S pole magnetic yoke 3b is provided within the mover 3. In the N magnetic pole 5 and S magnetic pole 6, a teeth core 18 is inserted. In FIG. 1, the teeth core 18 is constructed by layering a plurality of electromagnetic steel plates in a direction perpendicular to a direction of layering of the electromagnetic steel plates forming the magnetic yokes 3a and 3b.

When a current is applied in FIG. 1 from U-phase to V-phase and W-phase in the three-phase AC winding 16, a magnetic flux such as magnetic flux 19 shown in FIG. 1 is generated. This magnetic flux crosses the mover 3 and the stator 1 in three dimensions to form a three-dimensional magnetic path. This is similar to the linear motor of the related art described with reference to FIGS. 14–17. In the structure of FIG. 1, as shown in FIG. 2, the magnetic flux 19 generated from the stator 1 to the mover 3 is concentrated at yoke entrances 14 and 15 of the S pole magnetic yoke 3b when the magnetic flux flows from the magnetic pole 6 to the S pole magnetic yoke 3b. However, because the N magnetic pole 5 is formed such that it becomes wider as the distance from the stator 1 increases on the side of the N pole magnetic yoke 3a and the S magnetic pole 5 is formed such that it becomes wider as the distance from the stator 1 increases on the side of the S pole magnetic yoke 3b, the saturation limit of the magnetic flux of the yoke entrances 14 and 15 is greater and the motor thrust is improved.

In addition, in the structure shown in FIG. 2, the magnetic flux, among the magnetic flux 19 flowing from the stator 1 to the mover 3, which flows from the side of the N pole magnetic yoke 3a attempts to flow across the direction of layering of the electromagnetic steel plates forming the N magnetic pole 5, but, because the teeth core 18 is layered in a direction perpendicular to the direction of layering of the electromagnetic steel plates forming the N magnetic pole 5, the magnetic flux does not flow across the direction of layering of the electromagnetic steel plates, but instead smoothly flows through the teeth core 18 to the S pole magnetic yoke 3b. As a result, the magnetic flux does not cross the electromagnetic steel plates and a reduction of magnetic flux can be prevented, and, as a result, the generated output is improved.

When the magnetic flux changes while the motor is being driven, no large eddy current is generated between the electromagnetic steel plates because the electromagnetic steel plates are electrically insulated from each other by an insulating coating applied on a surface of the electromagnetic steel plates forming the teeth core 18, and, thus, the iron loss caused by the eddy current corresponding to the electrical resistance of the electromagnetic steel plates is inhibited, and the amount of heat generated in the motor is reduced.

On the other hand, although the magnetic flux 19 also flows across the direction of layering of electromagnetic steel plates around the common permanent magnet 13, because a change in the magnetic flux is small in this portion due to the strong magnetic field of the common permanent magnet 13, only slight amount of heat is generated, and, thus, countermeasures as employed in the teeth core 18 are unnecessary.

Second Preferred Embodiment

Figure 4:
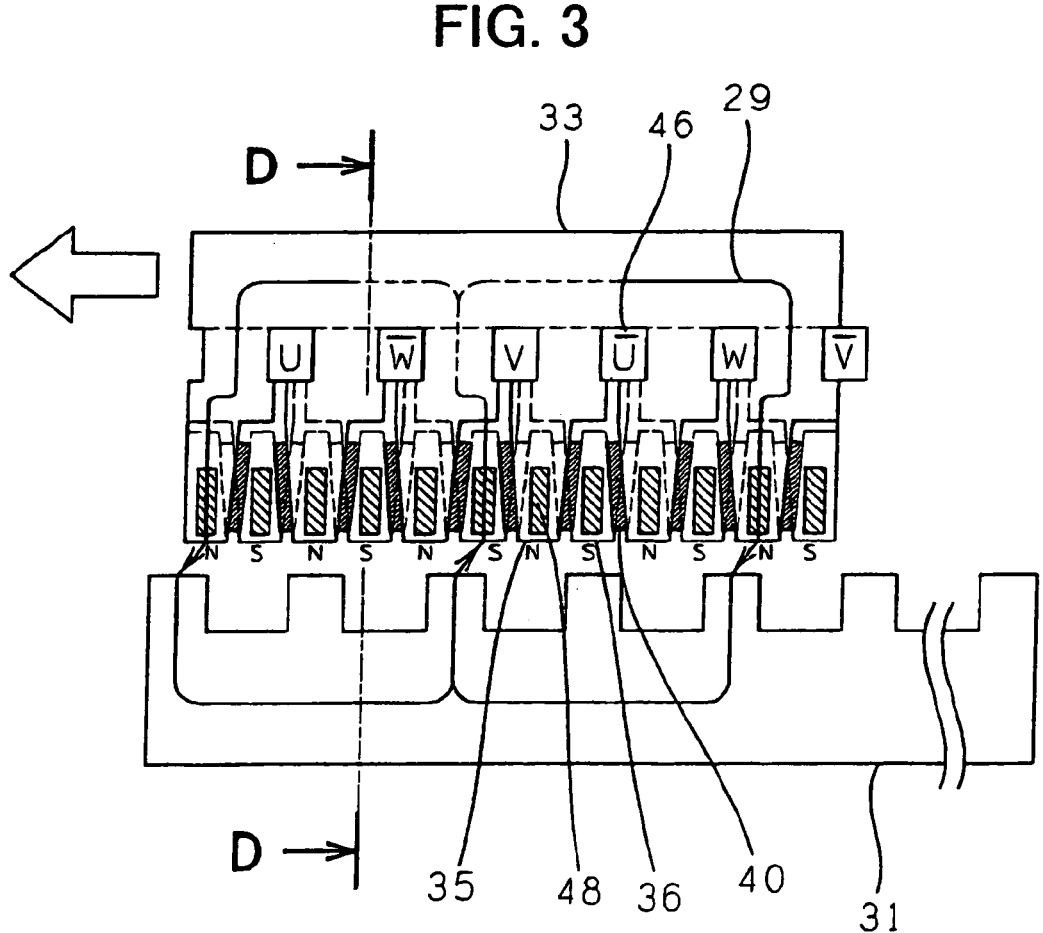
FIG. 4 is a diagram showing a linear motor according to a second preferred embodiment of the present invention.
Figure 5:
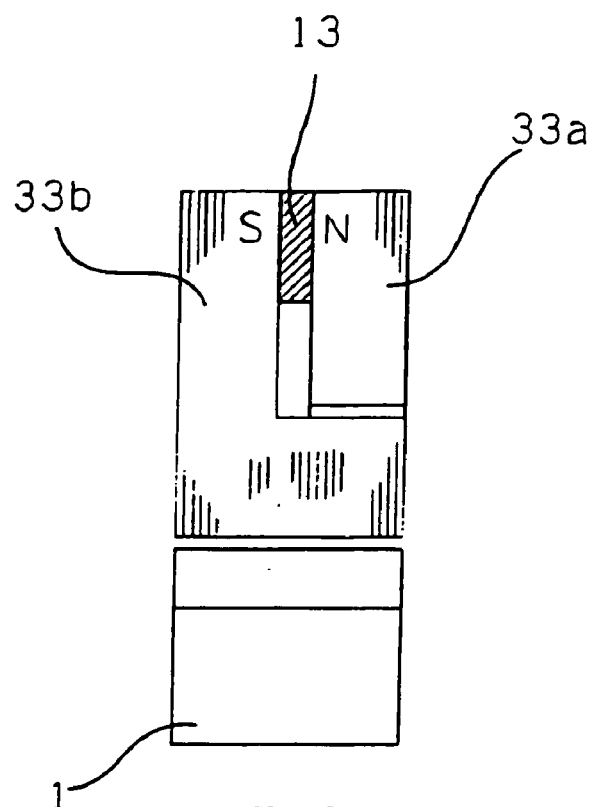
FIG. 5 is a diagram showing a D—D cross section of the linear motor of FIG. 4.
Figure 6:
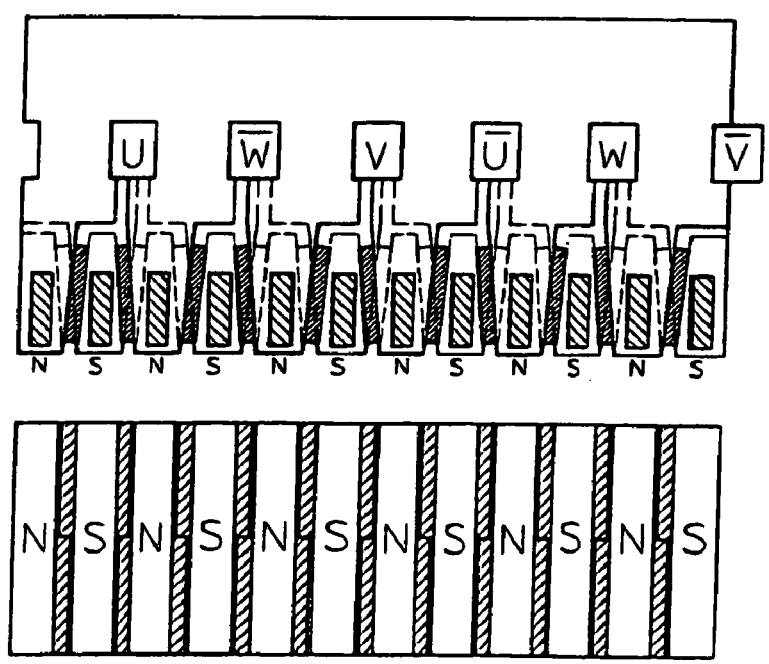
FIG. 6 shows a side view and a bottom view of the mover of the linear motor of FIG. 4.

FIGS. 4, 5, and 6 show a linear motor according to a second preferred embodiment of the present invention. FIG. 5 is a diagram showing a D—D cross section in FIG. 4 and FIG. 6 is a side and bottom views of a mover 33. Similar as in the first preferred embodiment, in this motor, a three-dimensional magnetic path is generated between the mover 33 and the stator 31, but the linear motor of the second preferred embodiment has a different configuration from the linear motor of the first embodiment. The second preferred embodiment will now be described referring to FIGS. 4, 5, and 6.

In FIGS. 4, 5, and 6, reference numeral 33 represents a mover, reference numeral 33a represents an N pole magnetic yoke, and reference numeral 33b represents an S pole magnetic yoke. The N pole magnetic yoke 33a and the S pole magnetic yoke 33b are formed by layering electromagnetic steel plates. Reference numeral 46 represents a three-phase AC winding and symbols indicating U-phase, V-phase, and W-phase are shown in FIGS. 4, 5, and 6. Reference numeral 35 represents an N magnetic pole, reference numeral 36 represents an S magnetic pole, and reference numeral 40 represents an auxiliary magnetic pole. The N pole magnetic yoke 33a and the S pole magnetic yoke 33b are configured such that they have almost equal width in a boundary portion with a stator 31. The N magnetic pole 35 is formed such that its width increases as the distance from the stator 31 increases on the side of the N pole magnetic yoke 33a and its width decreases as the distance from the stator 31 increases on the side of the S pole magnetic yoke 33b. On the other hand, the S magnetic pole 36 is formed such that its width decreases as the distance from the stator 31 increases on the side of the N pole magnetic yoke 33a and its width increases as the distance form the stator 31 increases on the side of the S pole magnetic yoke 33b. FIG. 6 shows that the N magnetic poles 35 and the S magnetic poles 36 are placed to alternate N pole, S pole, and so forth. As shown in FIG. 5, a common permanent magnet 13 which is magnetically connected to the N pole magnetic yoke 33a and the S pole magnetic yoke 33b is placed in the mover 33. In addition, a teeth core 48 is inserted to the N magnetic pole 35 and the S magnetic pole 36. In FIG. 4, the teeth core 48 is formed either by layering a plurality of electromagnetic steel plates in a direction perpendicular to the direction of layering of the electromagnetic steel plates forming the magnetic yokes 33a and 33b or formed from a block of magnetic material.

Structural differences between the linear motor of FIG. 4 and the linear motor of the first preferred embodiment include that a distributed winding is employed as the three-phase AC winding 46 and that a Vernier structure is employed in which a pitch of magnetic poles of mover 33 differs from a pitch of magnetic poles of stator 31.

When a current is applied to the three-phase AC winding of the linear motor according to the second preferred embodiment as described above, a plurality of pairs of magnetic poles 35 and 36 of N pole and S pole are excited either to the N pole or S pole by a magnetomotive force of the winding 46, depending on the direction of application of the U-phase, V-phase, and W phase windings. A three-dimensional magnetic path is then formed in the mover 33 from the N magnetic pole 35 through the N pole magnetic yoke 33a, the magnetic pole of common permanent magnet 13, the S pole magnetic yoke 33b, the S magnetic pole 36, and the stator 31 to return to the N magnetic pole 35. At this point, because a magnetic resistance difference force is generated corresponding to the positions of the mover 33 and the stator 31, a thrust is generated in the mover 33.

The flow of the magnetic flux will now be described in more detail. When a current is applied from the U-phase to the V-phase or W-phase, the three pairs of magnetic poles 35 and 36 shown in FIG. 4 are each excited either to the N pole or S pole, and, as shown by a magnetic flux 29, two three-dimensional magnetic paths are created which flows from the S magnetic pole 36 of the mover 33 through the S pole magnetic yoke 33b and the common permanent magnet 13 at the backside and then through the N pole magnetic yoke 33a on the front side to the N magnetic pole 35, and further through the stator 31 to return to the S magnetic pole 36. A force is then generated in a direction shown by an arrow illustrated in the boundary section of the mover 33 and the stator 31 of FIG. 4 and the mover 33 moves to the left.

As described, although the motor of the second preferred embodiment employs a Vernier structure, the configuration shown in FIGS. 4, 5, and 6, in which a common permanent magnet 13, the N pole magnetic yoke 33a, the S pole magnetic yoke 33b, the N magnetic pole 35, the S magnetic pole 36, and the stator 31 with projection and depression sections are provided and a current is applied to the three-phase AC winding 46 to form a three-dimensional magnetic path from the N magnetic pole 35 through the N pole magnetic yoke 33a, the common permanent magnet 13, the S pole magnetic yoke 33b, the S magnetic pole 36, and the stator 31 to return to the N magnetic pole 35 is similar to that of the first preferred embodiment. Therefore, by employing a structure in which a width of the N magnetic pole 5 of the mover 33 increases as the distance from the stator 31 increases on the side of the N pole magnetic yoke 33a, a width of the S magnetic pole 36 increases as the distance from the stator 31 increases on the side of the S pole magnetic yoke 33b, and a teeth core 18 is inserted into the N magnetic pole 35 and the S magnetic pole 36, it is possible to obtain advantages similar to those provided by the configuration of the first preferred embodiment.

As described, the present invention can be applied regardless of the winding method of the winding 46 or the placement of the magnetic poles 35 and 36 by providing a linear motor comprising a mover 33 comprising a common permanent magnet 13, an N pole magnetic yoke 33a, an S pole magnetic yoke 33b, an auxiliary magnet 40, an N magnetic pole 35, and an S magnetic pole 36 and a stator having projection and depression sections, and applying a current to the AC winding 46 to form a three-dimensional magnetic path from the N magnetic pole 35 through the magnetic yoke 33a, the common permanent magnet 13, the S pole magnetic yoke 33b, the S magnetic pole 36, and the stator 31 to return to the N magnetic pole 35.

In the first and second preferred embodiments described above, it is also possible to use a block of a magnetic material as the teeth core 18 or 48. However, when a block of a magnetic material is used, a large eddy current is generated when the magnetic flux changes, and therefore, effective heat reduction effect through insertion of the teeth core 18 or 48 cannot be expected in a high speed range. However, because the reduction in magnetic flux due to an insulating coating and an air layer which occurs in the case of layered electromagnetic steel plates does not occur, the motor thrust is improved. As such, it is desirable that a motor which uses a block of a magnetic material in the teeth core 18 or the teeth core 48 be used in a low speed operation in which generation of an eddy current is not a significant problem.

Because a magnetic material which is suitable as the block of a magnetic material and which has a characteristic of inhibiting generation of an eddy current by interposing an electrically insulating film to enclose particles of steel is commercially available, it is possible to use such a material to reduce the generation of heat in the high speed range and to achieve advantages similar to those which can be obtained by teeth core 18 or 48 formed by layering electromagnetic steel plates.

It is also possible to independently employ only the configuration in which a width of the N magnetic pole 5 or 35 increases as the distance from the stator 1 or 31 increases on the side of the N pole magnetic yoke 3a or 33a and decreases as the distance from the stator 1 or 31 increases on the side of the S pole magnetic yoke 3b or 33b or to independently employ only the configuration in which a teeth core 18 or 48 is inserted in the N magnetic pole 5 or 35 and the S magnetic pole 6 or 36, to independently achieve the advantages associated with the respective configurations.

Figure 7:
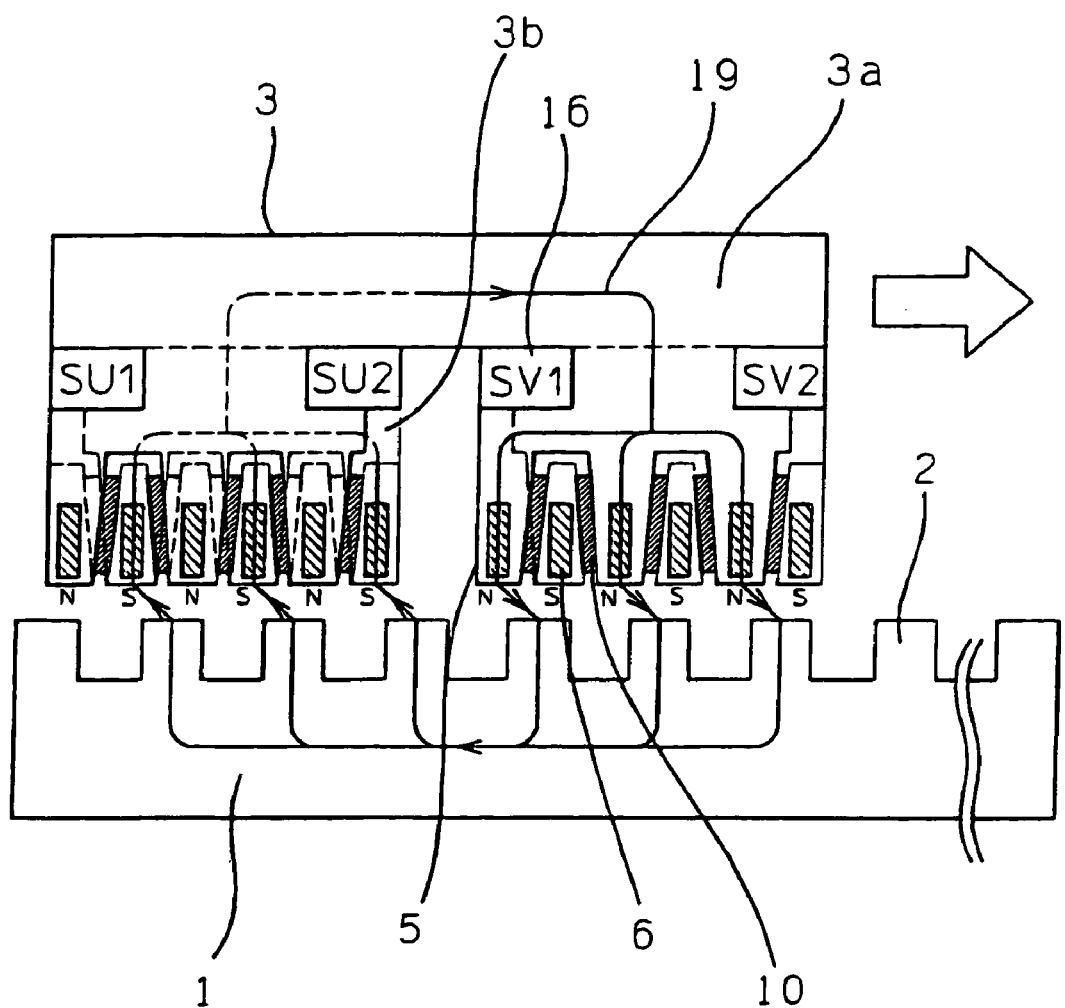
FIG. 7 is a diagram showing a two-phase linear motor according to a preferred embodiment of the present invention.

Even when a linear motor is formed having a structure shown in FIG. 7 in which the mover magnetic poles 4a and 4b among the three mover magnetic poles 4a, 4b, and 4c in the first preferred embodiment are used and which is driven by a two-phase AC winding, by applying a current from the U-phase to the V-phase in the winding, that is, by setting the SU1 and SV2 to be positive and SU2 and SV1 to be negative, it is possible to excite the mover magnetic pole 4a to S pole and the mover magnetic pole 4b to N pole and to form a three dimensional magnetic path by a magnetic flux from the S magnetic pole 6 through the S pole magnetic yoke 3b, the common permanent magnet 13, the N pole magnetic yoke 3a, the N magnetic pole 5, and the stator 1 to return to the S magnetic pole as shown by the magnetic flux 19, similar to the first preferred embodiment. Therefore, it is possible to apply the present invention similarly as in the first preferred embodiment.

Figure 8:
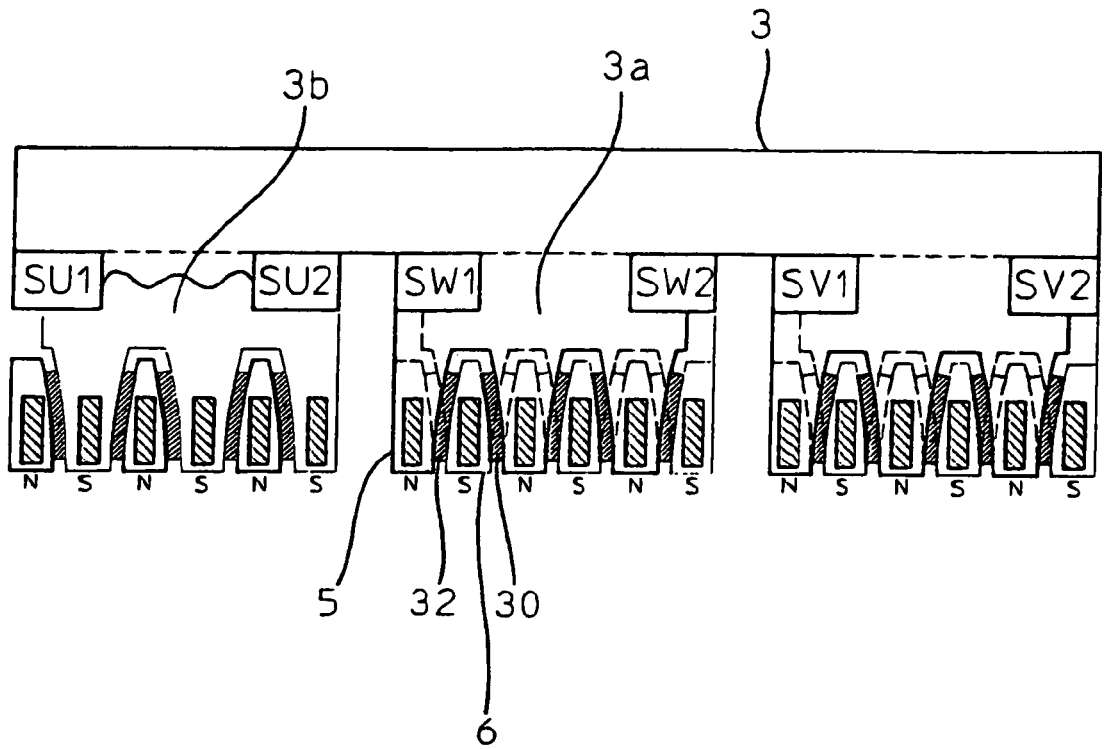
FIG. 8 is a diagram showing a linear motor which uses an auxiliary magnet of an arc shape according to a preferred embodiment of the present invention.
Figure 9:
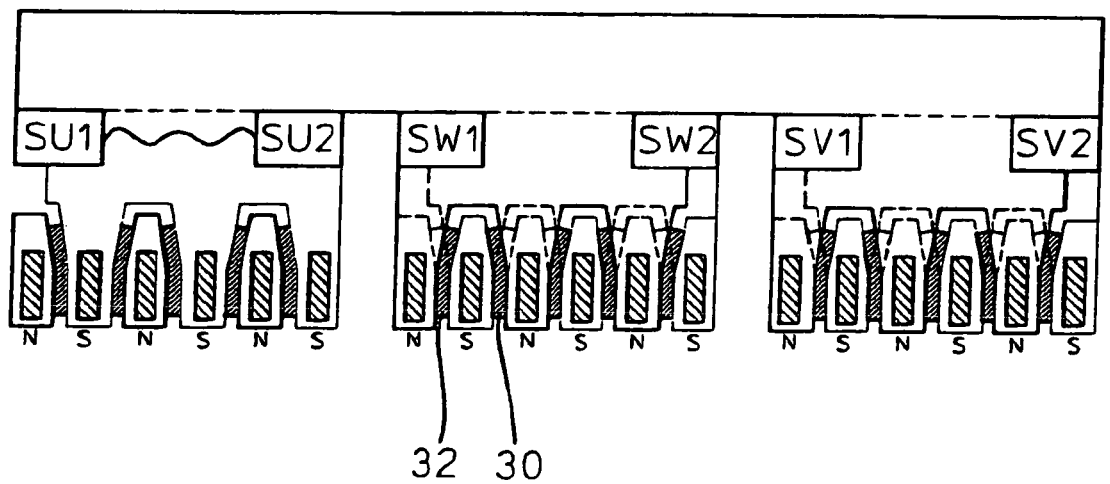
FIG. 9 is a diagram showing a linear motor which uses an auxiliary magnet of a bent shape according to a preferred embodiment of the present invention.
Figure 10:
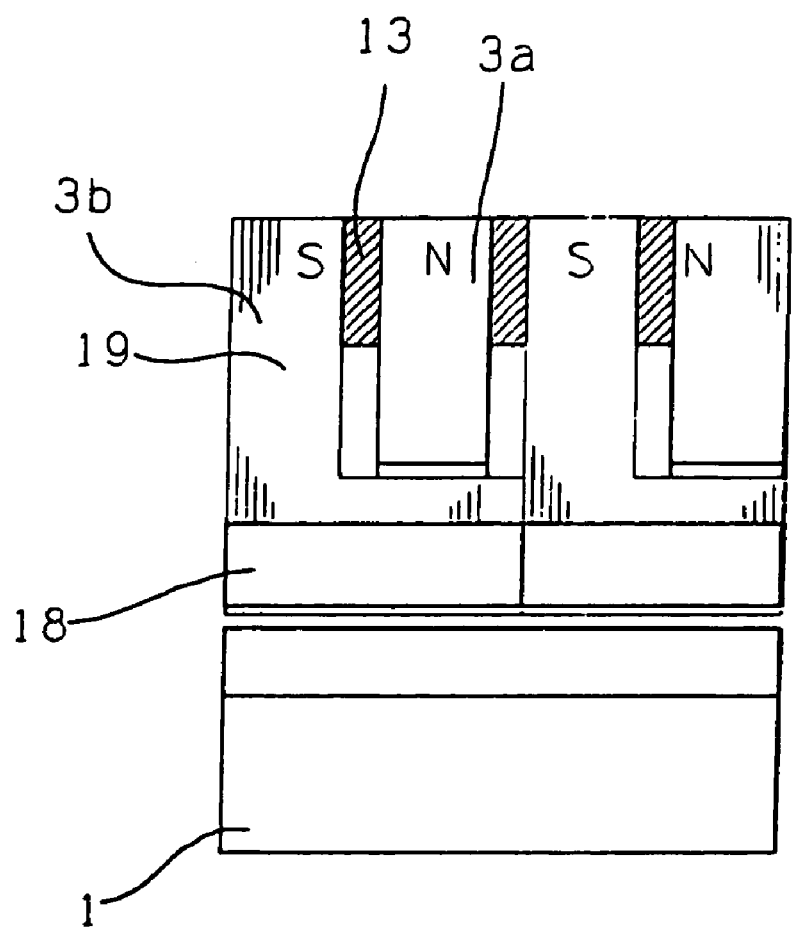
FIG. 10 is a diagram showing an arrangement of a plurality of linear motors according to a preferred embodiment of the present invention.

FIGS. 8 and 9 show linear motors in which a width of the N magnetic pole 5 increases as the distance from the stator 1 increases on the side of the N pole magnetic yoke 3a and a width of the S magnetic pole 6 increases as the distance from the stator 1 increases on the side of the S pole magnetic yoke 3b similar to the above-described configurations of first and second preferred embodiments, and an N pole auxiliary magnet and an S pole auxiliary magnet have different shapes than those in the first and second preferred embodiments.

FIG. 8 shows a linear motor which employs arc-shaped auxiliary magnets 30 and 32. An advantage of employing arc-shaped auxiliary magnets 30 and 32 is that the cross sectional areas of the N magnetic pole 5 and of the S magnetic pole can be increased compared to the N magnetic pole 5 and the S magnetic pole 6 of the first preferred embodiment. With this structure, the magnetic saturation limits of the N magnetic pole 5 and of the S magnetic pole 6 can be increased when a magnetic flux is generated from the stator 1 to the mover 3, which allows for a motor with larger thrust than that in the first preferred embodiment.

FIG. 9 shows a linear motor in which the rectangular auxiliary magnets of the first and second referred embodiments are bent into a "v" shape which is similar to the arc shape shown in FIG. 8. As described, it is possible to employ auxiliary magnets 30 and 32 with various shapes to apply the present invention and advantages similar to the present invention can be obtained even with auxiliary magnets 30 and 32 of different shapes.

As disclosed in Japanese Patent No. 3344645, it is also possible to apply the present invention to a motor in which a plurality of motors which use a permanent magnet 13 as generally described above regarding the first and second preferred embodiments are layered in a direction perpendicular to a direction of movement of the motor.

Figure 11:
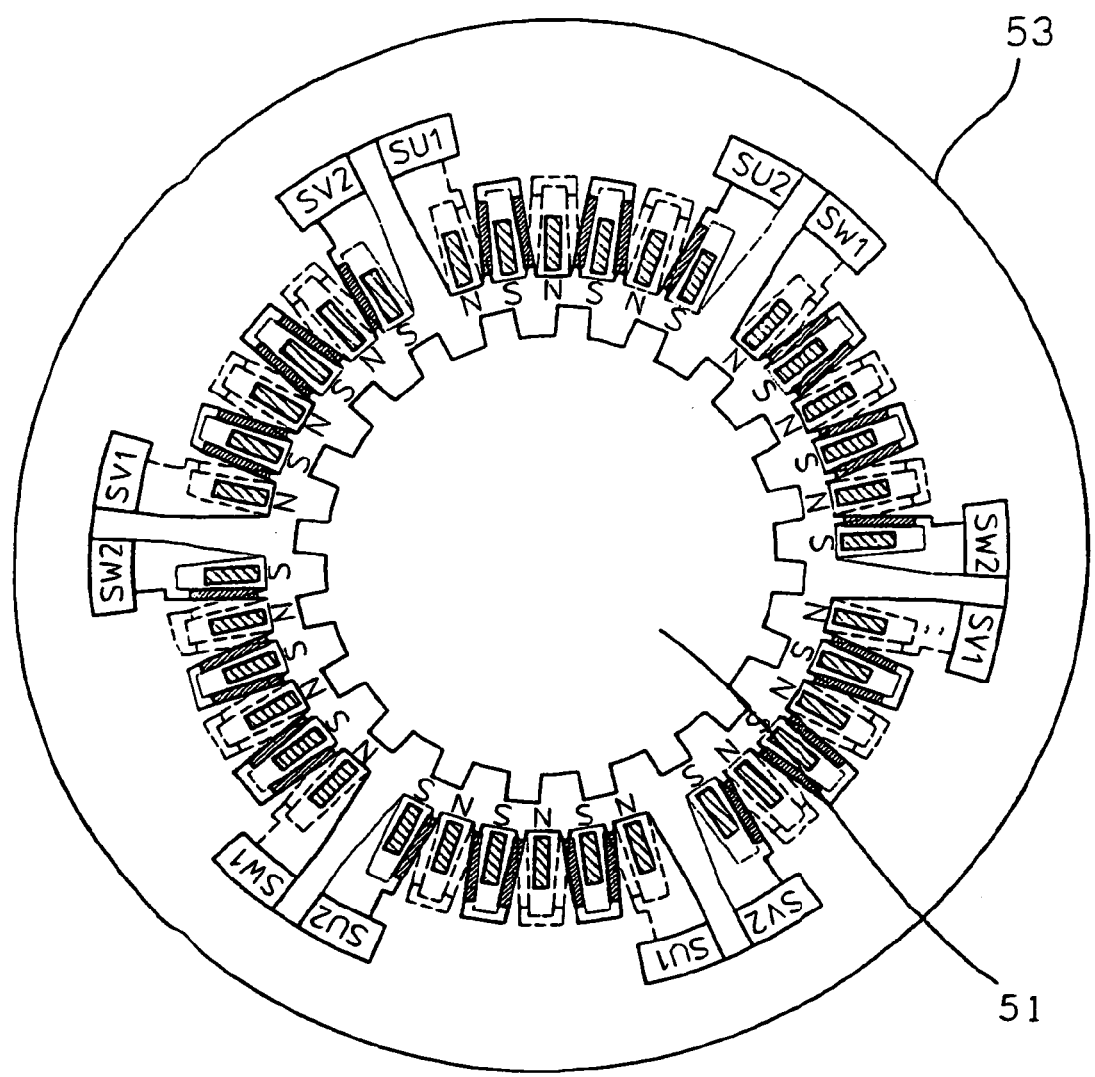
FIG. 11 is a diagram showing a rotational motor configured by modifying the linear motor of the first preferred embodiment of the present invention.
Figure 12:
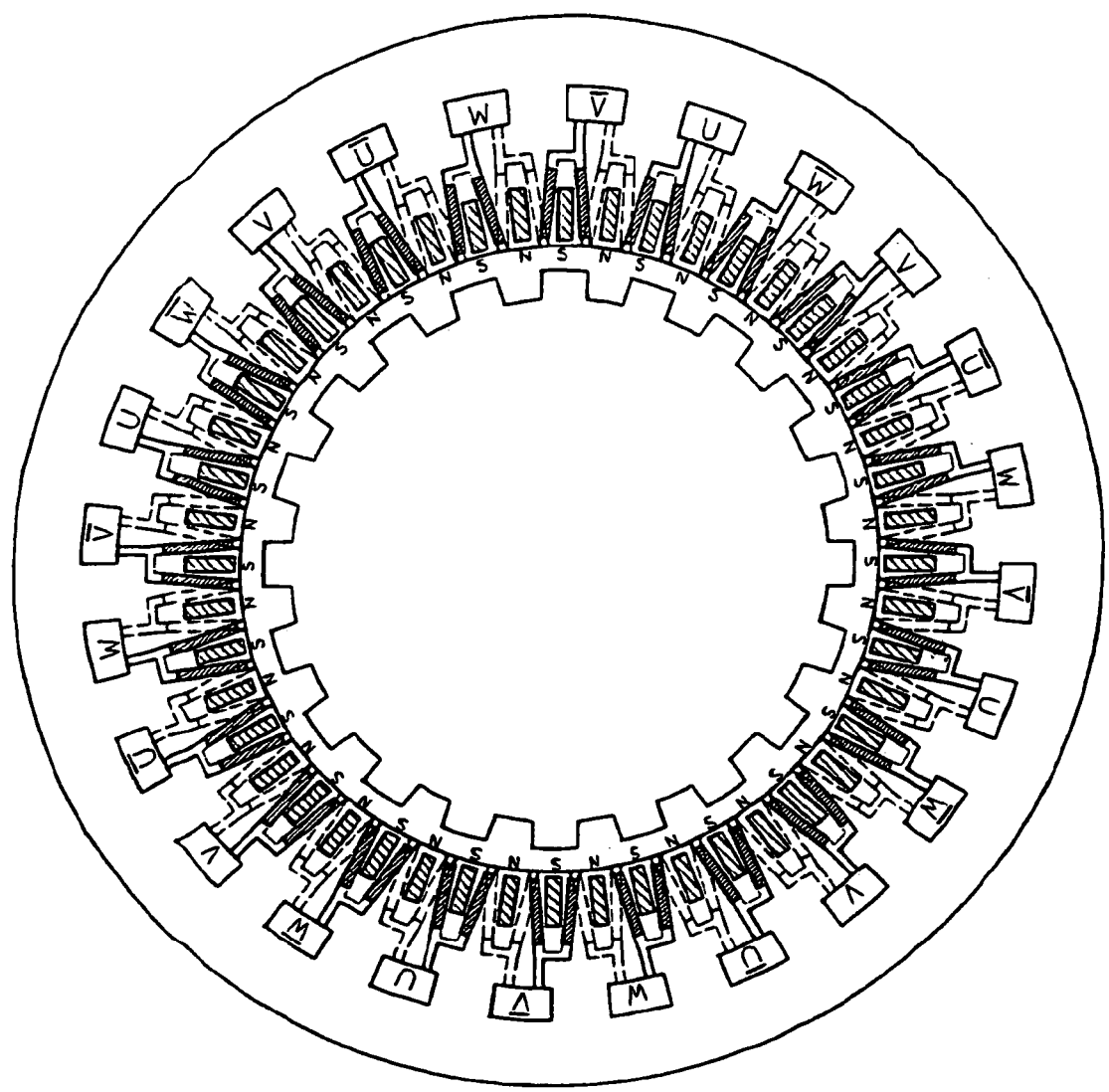
FIG. 12 is a diagram showing a rotational motor configured by modifying the linear motor of the second preferred embodiment of the present invention.

In addition, the structures of the first and second preferred embodiments can be modified for a rotation type motor as shown in FIGS. 11 and 12. A motor shown in FIG. 11 is a motor in which two linear motors of the first preferred embodiment shown in FIG. 1 are formed in an arc shape and connected in series. Similar to the structure of FIG. 1, the N magnetic pole 5 is formed such that its width increases as the distance from the stator 1 increases on the side of the N pole magnetic yoke 3a and its width decreases as the distance from the stator 1 increases on the side of the S pole magnetic yoke 3b. The S magnetic pole 6 is formed such that its width decreases as the distance from the stator 1 increases on the side of the N pole magnetic yoke 3a and its width increases as the distance from the stator 1 increases on the side of the S pole magnetic yoke 3b. Regarding the number of connected structures, when an even number of structures are connected in series, the motor is symmetric in 180 degrees, resulting in a balance between forces in radial direction generated between the mover 53 and the stator 51, and thus, no vibration or noise caused by unbalanced radial load is generated. Therefore, although the number of connected structures is not limited in the present invention, it is preferable that the number of connected structures be an even number.

The operational principle of the motor of FIG. 11 is similar to that of the first preferred embodiment, although there are differences between linear driving and rotational driving. When a current is applied from U-phase to V-phase and W-phase of three-phase AC winding similar to the first preferred embodiment, a force which rotates the rotor in a clockwise direction is generated. Therefore, it is possible to apply the present invention when the first preferred embodiment is applied to a rotation type motor.

The motor shown in FIG. 12 is a motor in which four linear motors of the second preferred embodiment shown in FIG. 4 are formed in an arc shape and connected in series. The operational principle of the motor shown in FIG. 12 and is identical to that of the second preferred embodiment. Therefore, the present invention can be applied when the second preferred embodiment is applied to a rotation type motor.

As described, by employing a structure in which a width of the N magnetic pole increases as the distance from the stator increases on the side of the N pole magnetic yoke and a width of the S magnetic pole increases as the distance from the stator increases on the side of the S pole magnetic yoke, it is possible to prevent saturation of magnetic flux near the yoke entrances 14 and 15. In addition, by providing a teeth core in the N magnetic pole and the S magnetic pole so that the magnetic flux is generated at the magnetic pole of the mover in a direction perpendicular to the direction of layering of electromagnetic steel plates, generation of an eddy current and reduction in magnetic flux due to an insulating coating and an air layer between electromagnetic steel plates are inhibited. Thus, it is possible to provide a motor which uses a permanent magnet in which generation of heat in the motor is reduced and the motor thrust is improved.

What is claimed is:

1. A motor employing a permanent magnet, the motor comprising:

a mover comprising a common permanent magnet placed along a direction of movement of the motor, an N pole magnetic yoke and an S pole magnetic yoke provided on both sides of and sandwiching the common permanent magnet, a plurality of N magnetic poles and S magnetic poles magnetically coupled to the magnetic yokes and placed to be perpendicular to the direction of movement of the motor and such that an N pole and an S pole are alternately placed, an auxiliary magnet provided between the N magnetic pole and an adjacent S magnetic pole, and an AC winding wound on the plurality of N magnetic poles and S magnetic poles; and a stator which is installed to form a predetermined gap between the stator and the mover, and having a plurality of projection and depression sections on a surface opposing the mover, wherein the N magnetic pole of the mover is formed such that its width increases as the distance from the stator increases on a side of the N pole magnetic yoke; and the S magnetic pole of the mover is formed such that its width increases as the distance from the stator increases on a side of the S pole magnetic yoke.

2. The motor employing a permanent magnet according to claim 1, the motor further comprising:

a teeth core which is formed of a plurality of layered electromagnetic steel plates is inserted in the N magnetic pole and S magnetic pole of the mover in a direction perpendicular to the direction of movement of the motor.

3. A motor according to claim 2, wherein the teeth core is formed of a block of a magnetic material and not of layered electromagnetic steel plates.

* * * * *